United States Patent [19]
Meister

[11] Patent Number: 5,231,331
[45] Date of Patent: Jul. 27, 1993

[54] AUTOMATIC VEHICLE HEADLIGHT/TAILLIGHT CONTROL

[75] Inventor: Jack B. Meister, Convent Station, N.J.

[73] Assignee: Echlin, Inc., Branford, Conn.

[21] Appl. No.: 842,559

[22] Filed: Feb. 27, 1992

[51] Int. Cl.$^5$ .................... H05B 37/00; B60Q 1/076; B60Q 1/08
[52] U.S. Cl. .................... 315/82; 307/10.8
[58] Field of Search .............. 315/77, 82, 83; 307/10.1, 10.8

[56] References Cited

U.S. PATENT DOCUMENTS

| | | |
|---|---|---|
| 3,500,119 | 3/1970 | Price . |
| 3,591,845 | 7/1971 | Vanderpoel, Jr. .................... 315/82 |
| 4,011,460 | 3/1977 | Kniesly et al. . |
| 4,330,716 | 5/1982 | Rust . |
| 4,956,562 | 9/1990 | Benedict et al. . |

*Primary Examiner*—David Mis
*Attorney, Agent, or Firm*—Barnes, Kisselle, Raisch, Choate, Whittemore & Hulbert

[57] ABSTRACT

Apparatus for operating exterior lights on an automotive vehicle under inclement weather conditions that includes an electronic switch responsive to a vehicle operator for selectively activating the vehicle windshield wipers under inclement weather conditions, and electronic circuitry responsive to the windshield wiper switch for automatically applying electrical power to the vehicle exterior lights. The electronic circuitry preferably comprises a latch circuit that is set by operator activation of the vehicle windshield wipers for maintaining illumination of the vehicle exterior lights even if the windshield wipers are later deactivated by the operator. The latch circuit is reset by operation of the vehicle ignition switch to disenable ignition at the vehicle engine. Thus, the vehicle exterior lights are activated and remain activated under inclement weather conditions that require operation of the windshield wipers.

6 Claims, 2 Drawing Sheets

5,231,331

AUTOMATIC VEHICLE HEADLIGHT/TAILLIGHT CONTROL

The present invention is directed to apparatus for automatically activating vehicle exterior lights under inclement weather conditions, and more particularly to an apparatus for applying electrical power to vehicle headlights, taillights and parking lights upon operator activation of the vehicle windshield wipers.

BACKGROUND AND OBJECTS OF THE INVENTION

It is desirable during operation of an automotive vehicle under inclement weather conditions—e.g., snow, sleet or fog—for the vehicle headlights, taillights, and/or parking lights to be illuminated. Operation of the vehicle exterior lights not only enhances visibility by the vehicle operator, but also enhances visibility of the vehicle to third parties. Laws in some jurisdictions require activation of the vehicle exterior lights during such low visibility conditions.

A general object of the present invention is to provide an apparatus for automatically activating the vehicle exterior lights in response to operator activation of the vehicle windshield wipers under inclement weather conditions. Another object of the present invention is to provide an apparatus of the described character that maintains illumination of the vehicle exterior lights after the vehicle windshield wipers have been activated even if the vehicle windshield wipers are subsequently deactivated by the vehicle operator. Yet another object of the present invention is to provide an apparatus of the described character that satisfies the foregoing objectives while being economical to manufacture and assemble, providing reliable service over an extended lifetime, being easy to repair in the event of malfunction, and/or adapted for assembly to a vehicle at the time of original equipment manufacture or by a consumer in the aftermarket.

SUMMARY OF THE INVENTION

Apparatus in accordance with the present invention for operating exterior lights on an automotive vehicle under inclement weather condition includes an electronic switch responsive to a vehicle operator for selectively activating the vehicle windshield wipers under inclement weather conditions, and electronic circuitry responsive to the windshield wiper switch for automatically applying electrical power to the vehicle exterior lights. The electronic circuitry preferably comprises a latch circuit that is set by operator activation of the vehicle windshield wipers for maintaining illumination of the vehicle exterior lights even if the windshield wipers are later deactivated by the operator. The latch circuit is reset by operation of the vehicle ignition switch to disenable ignition at the vehicle engine. Thus, the vehicle exterior lights are activated and remain activated under inclement weather conditions that require operation of the windshield wipers.

In the preferred embodiment of the invention, the apparatus takes the form of a base adapted to be affixed within a vehicle, and at least one electronic circuit module adapted to be removably plugged into the base. Electrical contacts on the base are connected by suitable electrical conductors to the windshield wiper control, the vehicle exterior lights, the vehicle battery and the ignition switch. Mating electrical contacts on the module interconnect these components with the circuitry within the module when the module is plugged into the base. Most preferably, the apparatus includes two modules, a first of which contains the latch and control circuitry in the form of solid state circuit components, and the second of which contains a power switch such as a relay responsive to the latch and control circuitry for connecting the vehicle exterior lights to the vehicle battery. Either or both modules may thus be readily replaced without requiring disconnection of the conductor harness.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
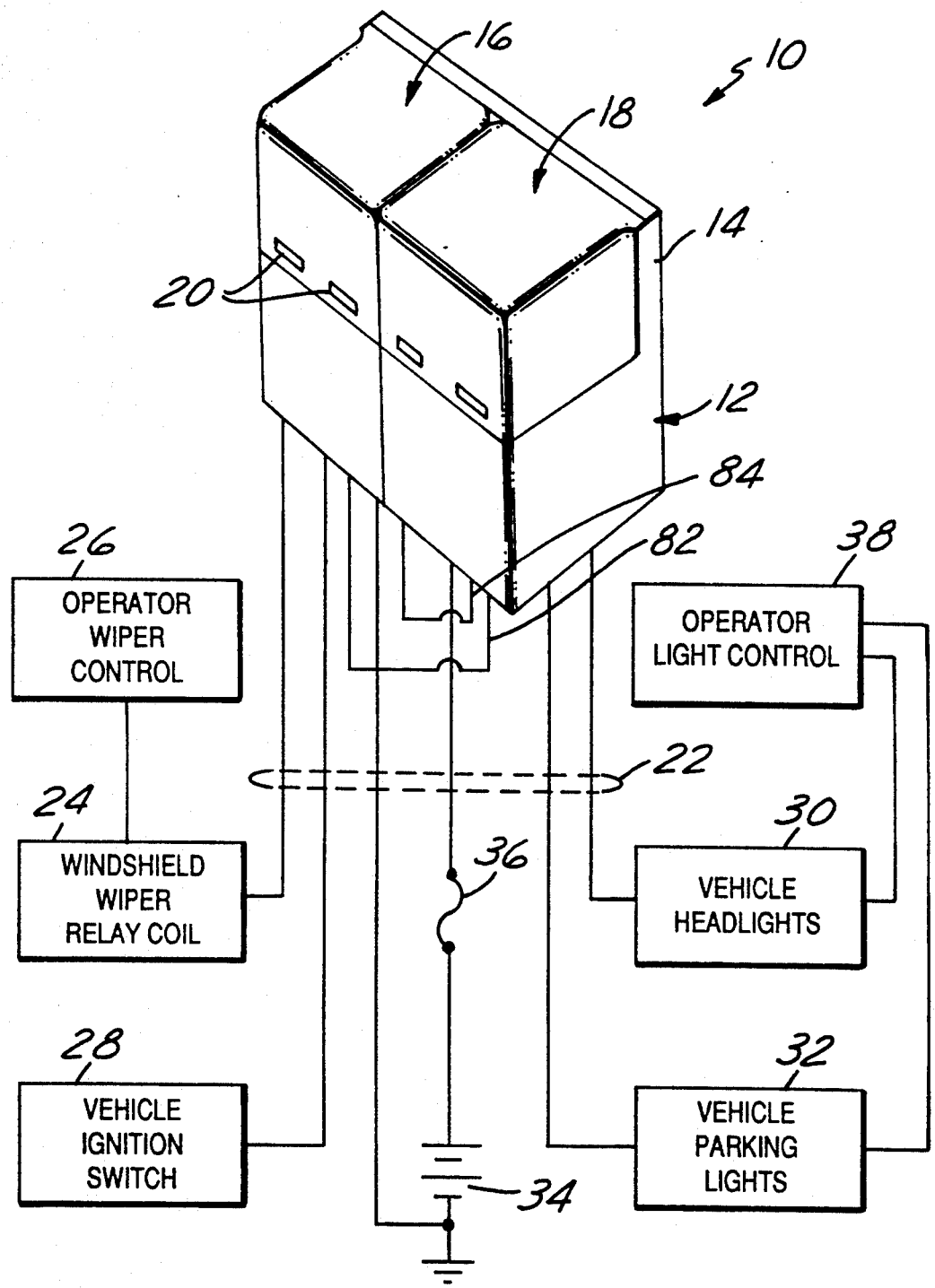
FIG. 1 is a functional block diagram that illustrates a preferred modular headlight control apparatus in accordance with the invention interconnected with other vehicle components.

The drawings illustrate apparatus 10 in accordance with a presently preferred embodiment of the invention as comprising a generally L-shaped base 12 having a flat back 14 adapted to be fixedly mounted at a suitable location on a vehicle, such as on the vehicle firewall beneath the vehicle hood. A pair of electrical modules 16, 18 are removably mounted on base 12 and locked thereto by spring tabs on base 12 that project through aligned apertures 20 within each module 16, 18. A plurality of the electrical conductors in the form of a wiring harness 22 extend from beneath base 12. Individual conductors of harness 22 are connected to the vehicle windshield wiper relay coil 24 that is responsive to a suitable operator switch 26 for applying electrical power to the windshield wiper motor(s). The vehicle ignition switch 28 is responsive to the vehicle operator for selectively enabling/disenabling operation of the vehicle engine ignition, vehicle headlights/taillights 30, vehicle parking lights 32, and vehicle battery 34 through an in-line fuse 36. Vehicle headlights/taillights 30 and parking lights 32 are also connected in the usual manner to an operator exterior light control 38 for activating the headlights/taillights and parking lights independently of apparatus 10. (The plural "wipers" includes the singular "wiper" where applicable.)

Figure 2:
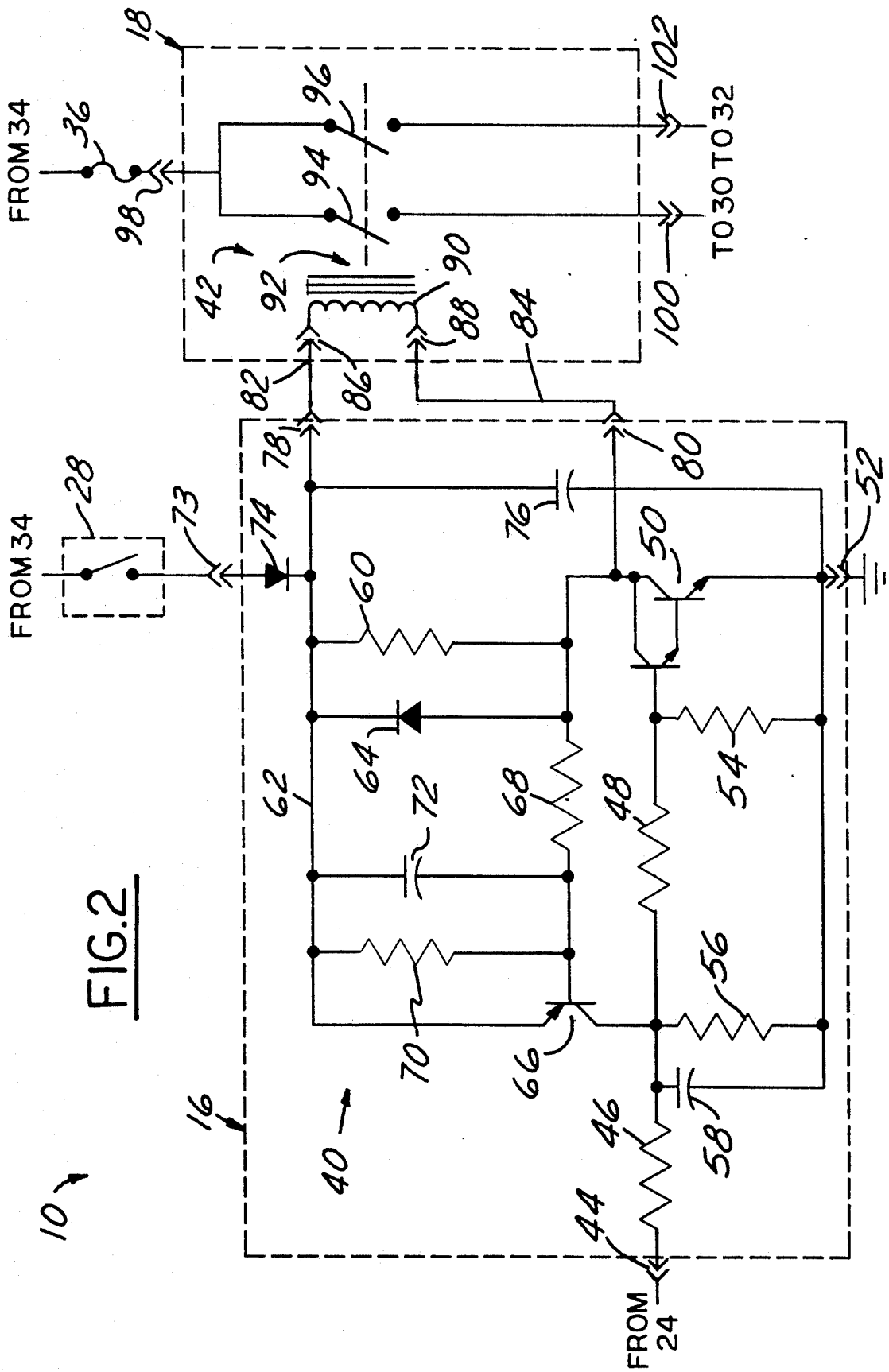
FIG. 2 is an electrical schematic diagram of the presently preferred embodiment of the invention.

FIG. 2 illustrates details of the control circuit 40 within module 16, and the power switch circuit 42 within module 18. Control circuit 40 receives a signal from windshield wiper relay coil 24 (FIG. 1) through harness 22 and mating electrical contacts 44 on module 16 and base 12. Contacts 44 are connected through a pair of resistors 46, 48 to the base of an NPN Darlington-pair power transistor switch 50. The emitter of transistor switch 50 is connected to electrical ground through mating contact set 52 on module 16 and base 12. A resistor 54 is connected between the base of transistor switch 50 and electrical ground, and a resistor 56 is connected between the junction of resistors 46, 48 and electrical ground. A noise-suppression capacitor 58 is connected across resistor 56. The collector of transistor switch 50 is connected through a resistor 60 to the power bus 62 of control circuit 40. A diode 64 is connected across resistor for suppressing reverse-voltage spikes. A PNP transistor 66 has its base connected through a resistor 68 to the collector of transistor switch 50, its emitter connected to bus 62 and its collector connected to the junction of resistors 46, 48. A resistor 70 and a noise-suppression capacitor 72 are connected in parallel across the base-emitter junction of transistor 66.

Power from battery 34 (FIG. 1) is applied by vehicle ignition switch 28 through a mating pair of electric contacts 73 on module 16 and base 12, and thence through an isolation diode 74 to power bus 62. A noise-suppression capacitor 76 is connected between power bus 62 and electrical ground. Power bus 62 and the collector of transistor switch 50 are connected by respective mating contact sets 78, 80 on module 16 and base 12 to a pair of jumper conductors 82, 84 (FIGS. 1 and 2), and thence through respective electrical contact sets 86, 88 on module 18 and base 12 to the coil 90 of an electrical relay switch 92. Relay switch 92 includes a pair of switch contact sets 94, 96 that are connected on one side through an electrical contact pair 98 to fuse 36 and battery 34 (FIG. 1), and on the opposing side through two contact pairs 100, 102 and harness 22 (FIG. 1) to vehicle headlights/taillights 30 and vehicle parking lights 32 respectively.

In operation, control circuit 40 within module 16 functions as a latch that is set by operation of windshield wiper relay coil 24 (FIG. 1) and reset through removal of electrical power by opening of vehicle ignition switch 28. More specifically, upon application of electrical power to bus 62 by closure of vehicle ignition switch 28, transistors 50, 66 are initially turned off or non-conducting, and no current is applied to coil 90 of relay 92. Upon operator activation of windshield wiper relay coil 24, a positive voltage is applied to the base of transistor switch 50 through resistors 46, 48, and transistor switch 50 becomes conductive. Current is thus drawn from power bus 62 through relay coil 90 in module 18, closing switches 94, 96 and applying power to vehicle exterior lights 30, 32. At the same time, as transistor switch 50 becomes conductive, the base of transistor 66 is drawn low through resistor 68, and transistor 66 thus becomes conductive for applying a positive electrical voltage to the base of transistor pair 50 from bus 62 across resistor 56 independently of the input from windshield wiper relay coil 24. Thus, even if the operator deactivates windshield wiper coil 24 through operation of wiper control switch 26 (FIG. 1), transistor 66 functions to maintain the conductive or set condition at transistor switch 50, continuing to energize relay coil 90 and maintain switches 94, 96 in their closed conditions. The vehicle exterior lights therefore remain energized even if the operator deactivates the windshield wipers. The latch circuit of transistors 50, 66 is reset by removal of electrical power from bus 62 through opening of the vehicle ignition switch 28. Thus, the latch remains set and the vehicle exterior lights remain illuminated until the vehicle is turned off.

There has thus been disclosed in accordance with the present invention an apparatus for automatically operating the vehicle exterior lights under inclement weather conditions that fully satisfies all of the objects and aims previously set forth. The vehicle exterior lights are automatically illuminated when the vehicle operator activates the windshield wipers. The apparatus circuitry is provided in the form of a pair of modules 16, 18, module 16 containing solid state control latch circuitry and module 18 containing the electrical power switch circuitry in the form of an electromagnetic relay 92. The provision of electronic modules, in cooperation with the mating contact pairs 44, 52, 73, 78-84 and 98-102 (FIG. 2) on the modules and base 12 provide ready replacability of the modules in the event of failure without requiring disconnection of wiring harness 22 or jumper conductors 82, 84. Nor does apparatus 10 of the present invention interfere in any way with manual operation of either the windshield wipers or the vehicle exterior lights. The apparatus of the present invention may also be used in conjunction with other automatic means for operating either the windshield wipers or the exterior lights.

The disclosed embodiment of the invention is intended for operation in conjunction with a windshield wiper control 26 and/or coil 24 that supplies a positive input at contacts 44. However, the disclosed control circuit may also be employed in application where the input signal goes to ground by adding inverter to the input. The circuit of FIG. 2 may also be employed in situations where it is desired to activate the vehicle lights whenever the ignition is turned on by connecting notch 28 to contacts 44 in place of coil 24.

I claim:

1. Apparatus for operating lights on an automotive vehicle under inclement weather conditions that comprises:

means responsive to a vehicle operator for activating windshield wipers on the vehicle under inclement weather conditions, and control circuit means coupled to said wiper-activating means and responsive to operator activator of the vehicle windshield wipers for automatically applying electrical power to the vehicle lights, said control circuit means including a base adapted for mounting on a vehicle, connection means on said base for electrical connection to said means for activating said windshield wipers and to the vehicle lights, a first module including solid state circuit means responsive to activation of the windshield wipers for providing a control signal, and a second module including power switch means responsive to said control signal for applying electrical power to the vehicle lights, said first and second modules being independently removably mounted on said base and said base including means for feeding said control signal from said first module to said second module.

2. The apparatus set forth in claim 1 wherein said solid state circuit means includes latch circuit means for maintaining application of electrical power to the lights in the event of deactivation of the windshield wipers.

3. The apparatus set forth in claim 2 wherein said vehicle includes means for selectively enabling engine operation, and wherein said latch circuit means includes means responsive to disenablement of engine ignition for removing electrical power for the vehicle lights.

4. Apparatus for operating lights on an automotive vehicle that includes a source of electrical power, vehicle windshield wiper means and vehicle exterior lights, said apparatus comprising:

first means responsive to an operator for selectively applying electrical power from said source to operate said windshield wiper means, second means responsive to the operator for selectively applying electrical power from said source to operate exterior lights independently of said first means, third means coupled to said first means and responsive to application of electrical power to said windshield wiper means for applying electrical power to said exterior lights independently of said second means, said third means comprising latch circuit means having a set condition in which said source is connected to said vehicle exterior lights and a reset condition in which said source is disconnected from said lights, means for placing said latch circuit means in said set condition responsive to said first means, and means for placing said latch circuit means in said reset condition independently of said first means, and a base adapted for mounting on a vehicle, at least one plug-in module containing said latch circuit means removably mounted on said base, electrical contact means on said base and module, and electrical conductor means connecting said contact means on said base to said source, said wiper means and said lights.

5. The apparatus set forth in claim 4 wherein said vehicle includes means for selectively enabling and disenabling ignition at said vehicle, and wherein said means for placing said latch circuit means in said reset condition comprises means responsive to disenablement of ignition at the vehicle.

6. The apparatus set forth in claim 5 further comprising a second module removably mounted on said base and electrical switch means within said second module responsive to said latch circuit means for connecting said light to said source.

* * * * *